United States Patent [19]

Sandor et al.

[11] Patent Number: 5,113,213
[45] Date of Patent: May 12, 1992

[54] COMPUTER-GENERATED AUTOSTEREOGRAPHY METHOD AND APPARATUS

[76] Inventors: Ellen R. Sandor, P.O. Box 8396, Chicago, Ill. 60680; Daniel J. Sandin, 1301 N. Astor, Chicago, Ill. 60610; William T. Cunnally, 1010 E. Morris Dr., Palatine, Ill. 60067; Stephan B. Meyers, 4636 N. Paulina St., Chicago, Ill. 60640

[21] Appl. No.: 296,775
[22] Filed: Jan. 13, 1989
[51] Int. Cl.⁵ .................. G03B 27/32; G03B 35/00
[52] U.S. Cl. ............................... 355/22; 355/77
[58] Field of Search ................... 355/22, 77, 40; 354/112–115; 352/85, 86; 358/88, 89

[56] References Cited

U.S. PATENT DOCUMENTS

| | | |
|---|---|---|
| 666,424 | 1/1901 | Ives . |
| 725,567 | 4/1903 | Ives . |
| 1,260,682 | 3/1918 | Kanolt . |
| 3,306,974 | 2/1967 | Cunnally . |
| 3,772,465 | 11/1973 | Vlahos et al. .................. 178/5.2 D |
| 3,953,869 | 4/1976 | Lo et al. .................. 355/22 X |
| 4,120,562 | 10/1978 | Lo et al. .................. 350/130 |
| 4,158,501 | 6/1979 | Smith .................. 354/112 X |
| 4,468,115 | 8/1984 | Lao .................. 355/22 |
| 4,481,050 | 11/1984 | Gundlach et al. .................. 354/112 X |
| 4,557,954 | 12/1985 | Gundlach et al. . |
| 4,596,458 | 6/1986 | Gundlach . |
| 4,600,297 | 7/1986 | Winnek .................. 355/22 |
| 4,853,769 | 8/1989 | Kollin .................. 358/88 |
| 4,903,069 | 2/1990 | Lam .................. 355/22 |

OTHER PUBLICATIONS

R. Guzik, "Current Technology in 3-D Electronic Displays", Electronic Imaging '88 Anaheim, Calif. (Mar. 30, 1988).
B. Saunders, "Stereoscopic Drawing by Computer–Is It Orthoscopic?", Appl. Opt. vol. 7, No. 8, pp. 1499–1504 (Aug. 1968).
"Phscolograms by (Art)ⁿ", catalog relating to an art exhibition conducted at Fermilab, Batavia, Illinois between Nov. 11, 1987 and Jan. 6, 1988.
"Exhibition of Computer Art", ACM/SIGGRAPGH Traveling Art Show 1985, p. 52 (1985).
T. Okoshi, "Three-Dimensional Imaging Techniques", Academic Press, N.Y. (1976).
A. Ortony, "A System for Stero Viewing", The Computer Journal, vol. 14, No. 2, pp. 140–144 (May 1971).
H. Ives, "The Chromolinoscope Revised", J. Opt. Soc. Amer. 20, pp. 343–353 (Jun. 1930).
H. Ives, "A Camera For Making Parallax Panoramograms", J. Opt. Sci. Amer. 17, pp. 435–439 (Dec. 1928).
M. Neal, "More than Science, More than Art", IEEE Computer Graphics and Applications, pp. 3–5 (Nov. 1988).

*Primary Examiner*—L. T. Hix
*Assistant Examiner*—Della Rutledge
*Attorney, Agent, or Firm*—Kirkland & Ellis

[57] ABSTRACT

There is disclosed a method of making autostereographic images of an object, comprising the steps of inputting to a computer a predetermined number of planar images of the object, each of the planar images being a view of the object, from one of the predetermined number of different viewpoints; interleaving the predetermined number of planar images in the computer; and printing the interleaved images with a high-resolution output imaging device on a spacer, a selected edge of each interleaved image being aligned with a predetermined direction on the spacer.

Also disclosed is an apparatus for making autostereographic images of an object, comprising a device for generating a predetermined number of planar images of the object, each planar image being a view of the object from one of the predetermined number of different viewpoints; a computer, the computer interleaving the predetermined number of planar images; and a high-resolution output imaging device, the output imaging device being in communication with the computer, for printing the interleaved images on a transparent spacer with selected edges of the images being aligned with a predetermined direction.

Also disclosed is an autostereograph, comprising a transparent spacer; a predetermined number of planar images, the planar images being views of an object from the predetermined number of different viewpoints and being interleaved in strips and printed on a side of the spacer; and a device for viewing predetermined ones of the strips according to an observation position, the viewing means being disposed on the opposite side of the spacer.

15 Claims, 3 Drawing Sheets

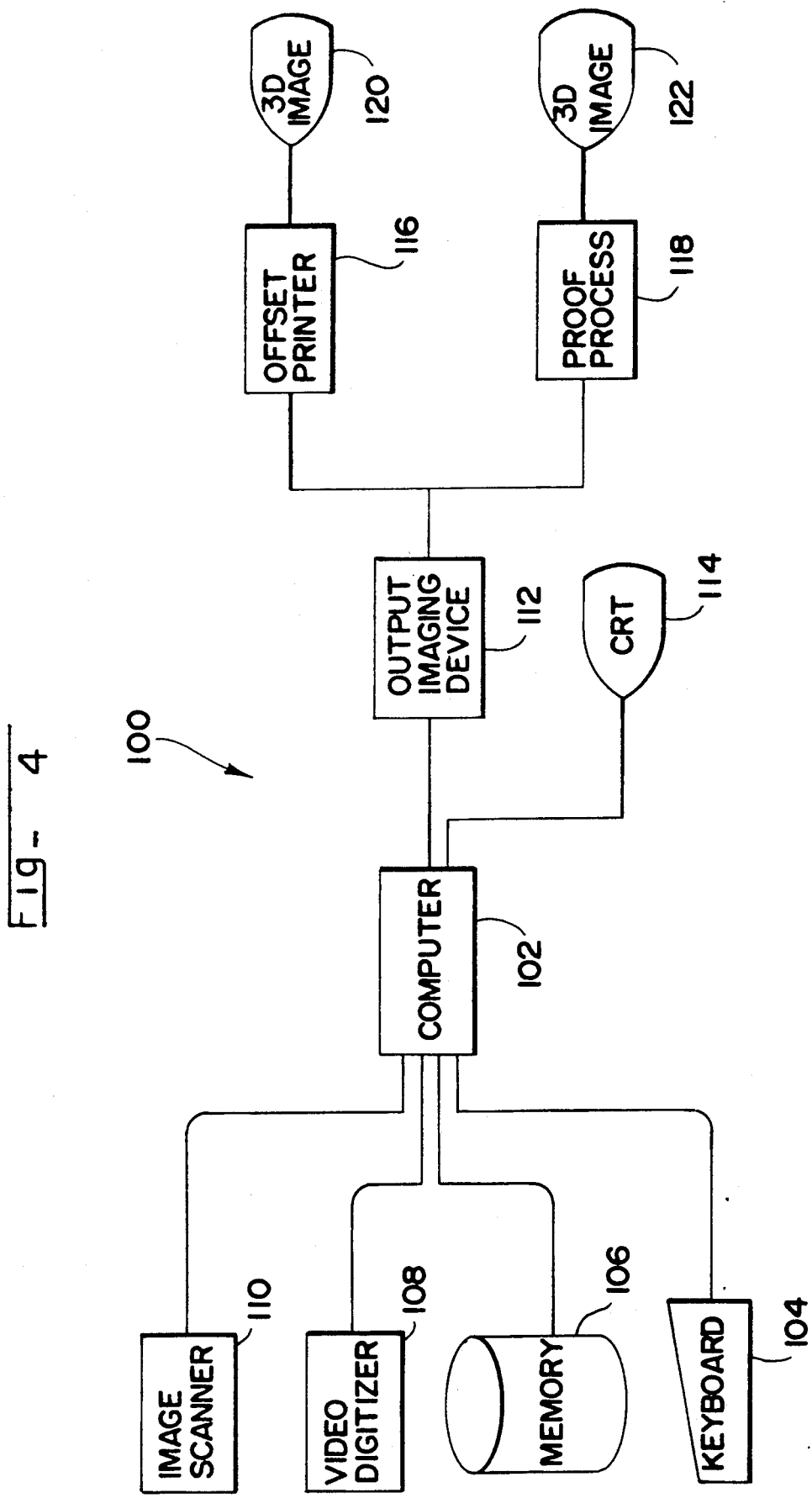

COMPUTER-GENERATED AUTOSTEREOGRAPHY METHOD AND APPARATUS

BACKGROUND

The present invention relates to three-dimensional imaging and more particularly to autostereoscopic imaging.

Three-dimensional (3D) imaging relies on the human ability to receive two dissimilar images of the same object simultaneously and thus perceive depth. The image projections for stereo or binocular viewing have not changed since Euclid's description in 280 A.D.; however, technologic and photographic advances have made it easier to produce the two images that stimulate the eye's binocular parallax and convergence cues. The power and flexibility of computer graphic tools and techniques facilitates the creation of stereoscopic images.

The stereoscope was developed in the 1800's by Niepce, Wheatstone, Brewster and Holmes, but major achievements in and public awareness of 3D imaging did not occur until the 1900's. Stereocameras that produced binocular picture information were developed, some of which are still available today, and related technologies evolved from Kennedy, Kanolt, Lippmann and Ives. The technologies explored were the parallax barrier, chromolinoscope, panoramagram, and integral fly's-eye and lenticular photography. By the mid 1900's anoglyphic and polarized 3D movies had been developed. Cinerama and holography retained public interest, with work being done throughout the world in autostereographic television and lenticular-sheet 3D pictures. Advancements to lenticular-sheet imaging were made by scientists Vanbenschoeten, Bonnet and Winnek, and by industries, including Eastman Kodak and Japan's Toppan and Dai-Nippon printing companies.

One form of stereography, based on parallax barriers, is carried out in the chromolinoscope and panoramagram that are described in U.S. Pat. Nos. 666,424 and 725,567, and in H. E. Ives, "The Chromolinoscope Revived," J. Oct. Soc. Amer. 20, pp. 343-353 (June 1930) and H. E. Ives, "A Camera for Making Parallax Panoramagrams," J. Opt. Soc. Amer. 17, pp. 435-439 (Dec. 1928). Other forms of stereography are described in B. Jéquier, "Some Simple Means of Realizing 3D Images with Standard Material in Diverse Fields of Medicine, Industry and Research," Proceedings of the SPIE No. 402/37, Geneva (1983), S. H. Kaplan, "Theory of Parallax Barriers," J.SMPTE 59, No. 7, pp. 11-21 (July 1952), and T. Okoshi, Three-Dimensional Imaging Techniques, Academic Press, New York (1976).

As illustrated in FIG. 1, the parallax barrier or barrier strip method cuts a predetermined number of different views of an object into vertical columns (oriented perpendicular to the plane of the Figure), interleaves the columns on a film or transparency 11, and positions them behind the slits of a barrier strip or line screen 12 that is fixed at a predetermined position with respect to the film 11, for example by a transparent spacer 13. Strips 11-1 thru 11-5 of five different 2D or planar views are interleaved in FIG. 1. The position of the eye 14 determines what view the observer sees, five eye positions 14-1 thru 14-5 being shown, and in this way a truly spatial image, i.e., one which gradually shows its right side when the observer moves leftward and its left side when the observer moves rightward, can be perceived. Such a spatial image is sometimes called an autostereogram when more than two different views of the object are interleaved to distinguish it from a binocular or stereoscopic image.

Many 3D photographers today use Bonnet-style cameras which include barrier strips. In these devices it is the camera which interleaves or combines the several views. In a one-step dedicated process, they photograph a scene, and the barrier strip is immediately imposed on the film during processing in the camera. The images produced have a predetermined spatial frequency (also referred to as pitch, in lines per inch) and can only be magnified proportionally. As a result, images that are reduced or magnified may appear too fine or too coarse. Using a two-step combining process expands the photographer's flexibility to magnify or crop images. For example, a Jéquier-type projection system uses a given number of different negatives of an object scene, previously photographed on negative film from that number of different positions. Each negative is inserted, in sequence, in a movable stage that slides left and right; the recording film and barrier strip move accordingly. The system thus splits an image into vertical columns, interleaves them and records them on film.

Another camera-combining process is the Cunnally projection system which uses a movable barrier strip with the rest of the system remaining stationary. The barrier strip moves 1/n-th the distance between barrier strip lines for each of the n slides to be interleaved. The film recording the interleaved images is placed on a vacuum-backed table; the barrier strip is mounted in a frame which is attached to the table with spring-loaded pins. A micrometer is used to control the movement of the barrier strip with a precision up to 1/000-th of an inch.

Yet another image combining process in which a camera combines the images is the Illusion projection system which photographs n different scenes off a CRT screen. The lens and the CRT monitor move n proportional distances left and right; the film and barrier strip remain fixed. This process splits each image into vertical columns, interleaves them, and records them on film.

Other camera-based methods and apparatus for making 3D images are disclosed in U.S. Pat. Nos. 1,600,297; 4,596,458; 4,557,954; 4,481,050; 4,158,501 and 1,260,682, and in R. P. Guzik, "Current Technology in 3-D Electronic Displays," Electronic Imaging '88, Anaheim, Calif. (Mar. 30, 1988), A. Ortony, "A System for Stereo Viewing," The Computer Journal vol. 14, no. 2, pp. 140-144 (May 1971).

The inaccuracies and inflexibilities associated with the camera-combining techniques have, however, been a constant source of problems. Cameras are subject to geometric changes with temperature and humidity, exposure problems and color balance problems. The process itself is expensive and slow because of many processing steps, requires a large physical facility for camera, darkroom, and so on, and depends upon outside assistance for photoprocessing. Furthermore, camera-combining autostereography equipment is generally not very portable, and requires image subjects to be brought to a studio and to be motionless for long periods because of the large formats and small lens apertures they require. Because much of the imaging effort involved is already computer-based, using a computer to do the combining, thereby eliminating the photographic process altogether, has important advantages for stereography.

SUMMARY

In accordance with the present invention, a method of making autostereographic images of an object, comprises the steps of inputting to a computer a predetermined number of planar images of the object, each of the planar images being a view of the object from one of the predetermined number of different viewpoints; interleaving the predetermined number of planar images in the computer; and printing the interleaved images with a high-resolution output imaging device on a spacer, a selected edge of each interleaved image being aligned with a predetermined direction on the spacer.

In another aspect of the present invention, an apparatus for making autostereographic images of an object, comprises means for generating a predetermined number of planar images of the object, each planar image being a view of the object from one of the predetermined number of different viewpoints; a computer, the computer interleaving the predetermined number of planar images; and a high-resolution output imaging device, the output imaging device being in communication with the computer, for printing the interleaved images on a transparent spacer with selected edges of the images being aligned with a predetermined direction.

In another aspect of the present invention, an autostereograph, comprises a transparent spacer; a predetermined number of planar images, the planar images being views of an object from the predetermined number of different viewpoints and being interleaved in strips and printed on a side of the spacer; and means for viewing predetermined ones of the strips according to an observation position, the viewing means being disposed on the opposite side of the spacer.

BRIEF DESCRIPTION OF THE DRAWINGS

The several features and advantages of the present invention will be better understood from a reading of the following detailed description in conjunction with the drawings in which:

FIG. 4 shows an apparatus in accordance with the present invention;

DETAILED DESCRIPTION

Since the camera-combining process interleaves columns of different 2D or planar views or images, it has been found advantageous to generate barrier-strip autostereographs by using a computer to sort the different planar images and record them directly to film. In this way, the problems attendant to the camera-combining method are eliminated. Interleaving the planar images with a computer greatly increases the versatility of 3D imaging because the planar images may be obtained in any manner that can subsequently produce data manipulable by computer. Such planar images may be frames of real-time or recorded television, positive or negative transparencies or prints, or even the electronic data outputs of commercial compute graphics software.

Such a computer graphics environment that can be used to produce the planar images for autostereography would typically create graphical representations of mathematical equations. Once a graphical model, i.e., a simulated object which exists only in the computer, is developed, the model is rendered, i.e., color, lighting, textures, and so on are mathematically added, and an appropriate viewing angle and depth information are determined by observing the model on a CRT. To determine the viewing angle, the scene is rotated and observed on a CRT monitor until an angle is found that is aesthetically pleasing; then the resulting image is stored for subsequent processing. Ordinarily, that image would be the one the observer would see when standing directly in front of an autostereograph, i.e., it would be the center image of the interleaved images.

To give the illusion of depth, an off-axis perspective projection of the image, both left and right about a selected center of depth, is then mathematically determined, and the different offset images are stored in image data files in the computer. The center of depth is a point or detail of the object that is perceived as being on the image plane. Other object points and objects will then be perceived as being behind or before the center of depth, the selection of which is a matter of aesthetic choice. It will be understood that the degree of off-axis projection determines the amount of depth an observer sees when viewing the output.

Figure 2:
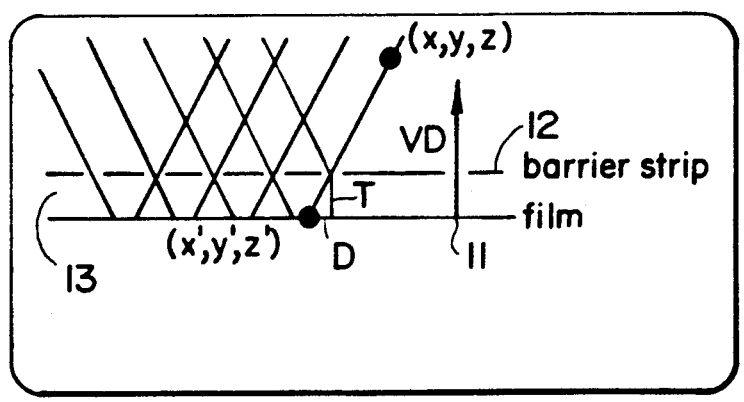
FIG. 2 illustrates off-axis projection geometry for computer-combining barrier-strip autostereography.

The off-axis projection is developed as follows. Referring to FIG. 2, if a point of the image is to be viewed at position (x,y,z) in front of the autostereograph, a position (x', y', z') on the film 11 that will make that projection must be determined. In the Figure, the x-axis is parallel to the film 11 and in the plane of the Figure, the y-axis is also parallel to the film 11 but perpendicular to the Figure, and the z-axis is perpendicular to the film 11 and in the plane of the Figure.

First, a shear of z by x by a factor of D/T, where T is the thickness of the spacer 13 and D is the distance between the film position x' and the appropriate slit in the barrier strip 12, is done, thus:

$$x' = x + (D/T)z$$

Shear operations are well-known but not used often in imaging processing, being one of the four transformations (translation, rotation, scaling and shear) that are usually applied to image data. It will be understood that by the phrase, "appropriate slit" is meant that slit through which the position (x', y', z') in the interleaved images will be seen by the observer at x, y, z. This equation is similar to the projection needed for camera-combining computer-generated images, except that no perspective projection factors are included because the barrier strip itself does a perspective projection for the viewer at viewing distance VD in the horizontal (x) direction. In the vertical (y) direction, a standard perspective projection from viewing distance VD normal to the film 11 is performed:

$$y' = \frac{(VD)(y)}{VD - z}$$

and finally:

$z' = 0$

Figure 1:
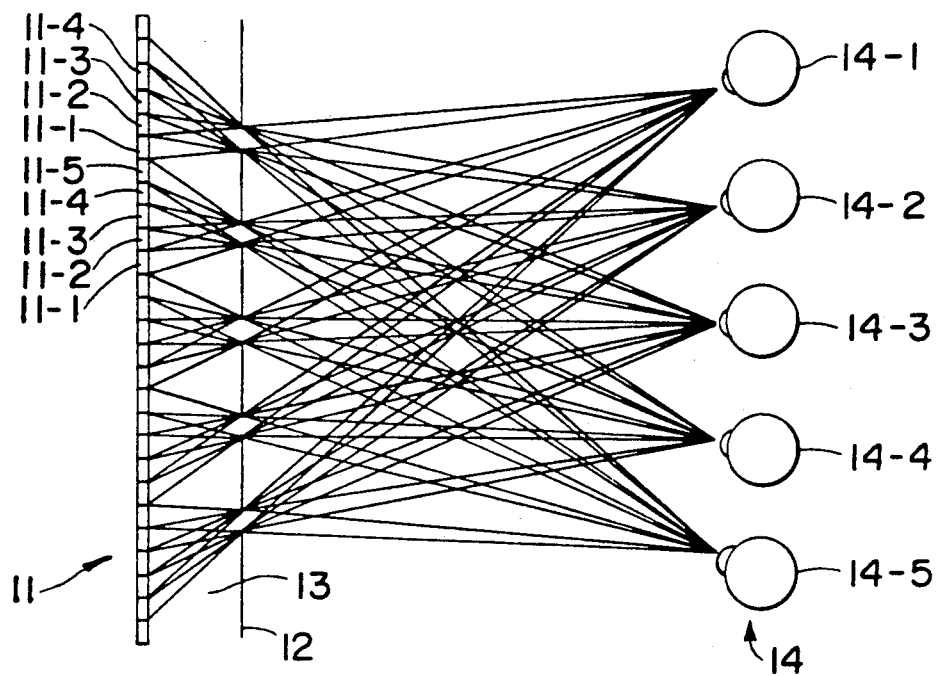
FIG. 1 illustrates the geometry of barrier-strip 3D imaging.

It will be understood that the number of computations for combining n different images of an object into a single autostereograph are dependent on the size, i.e., the height and width, of the output film 11, the image resolution of the output device, e.g., in dots per inch, and the number n of planar images to be interleaved. Once properly projected, the data representing the planar images are easily sorted by the computer and written to an output device, with image 1, strip 1 being placed next to image 2, strip 1, followed by image 3, strip 1, etc. on film 11 as illustrated in FIG. 1.

It will be understood that images of simulated objects from computer graphics environments can also be used in camera-combining methods of autostereography by displaying each image, one by one, on a CRT that is then photographed. However, an additional perspective projection must be added to the off-axis projection described above.

In accordance with the present invention, the barrier strip may also be written by the computer to the output device in a similar way. The barrier strip, which is similar to a Ronchi grating, typically comprises 1 or 2 clear strips followed by n-1 or n-2, respectively, black or blocking strips, followed by 1 or 2 clear strips, etc. Ordinarily, the duty cycle of the barrier strip 12, i.e., the ratio of its transparent to blocking sections, is approximately 1/n or 2/n and the distance of the strip 12 from the film 11, i.e., the thickness of spacer 13, is partially set, together with the width of the slits, by well-known diffraction considerations. Pitches of 40 and 60 lines per inch are commonly used for barrier strip autostereographs. Selecting the duty cycle of the barrier strip involves a subjective tradeoff; lower duty cycle, blacker barrier strips generally produce sharper 3D images at the expense of reduced image brightness, while higher duty cycle strips produce brighter 3D images with less perceived jumpiness or stepping of the image as the observer moves at the expense of reduced sharpness of the image objects perceived as being closer to the observer. By using the same imaging device and method to produce both the barrier strip and the interleaved images, problems in synchronization of the barrier strip and images are avoided, minimizing moire and ensuring a good fit between the barrier strip and the interleaved images.

Figure 3B:
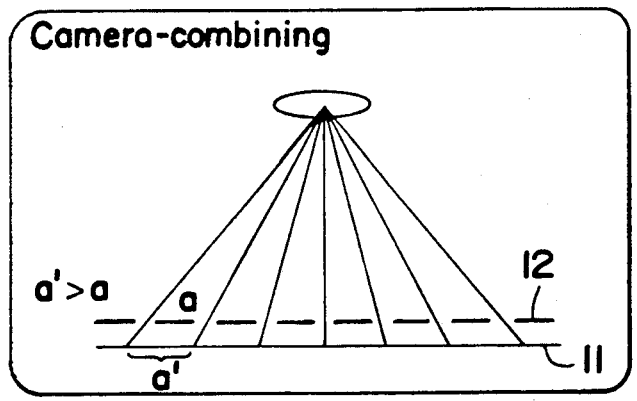
FIGS. 3a and 3b illustrate projection geometries for planar image points in computer-combining and camera-combining barrier-strip autostereography.
Figure 3A:
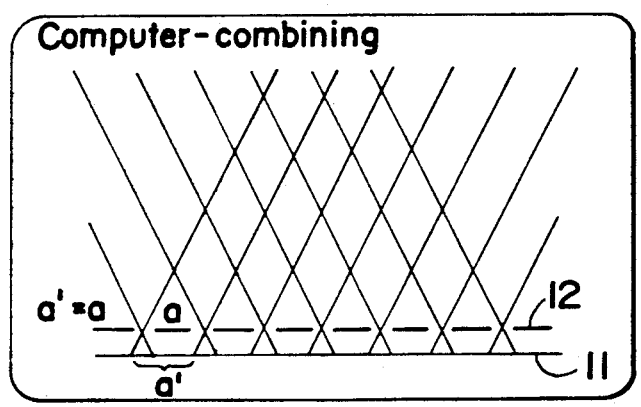

Furthermore, autostereographs produced by the computer-combining method of the present invention include barrier strips that typically have the same pitch as the interleaved image strips. Referring to FIG. 3a, the sum, a, of the widths of one image strip from each of the predetermined number of planar images interleaved on film 11, that is also just the width of each planar image, is identical to the sum, a, of the widths of one clear slit and one blocking segment of the barrier strip 12. In contrast, autostereographs produced by camera-combining methods use barrier strips having pitches finer than the pitches of the planar images, as illustrated in FIG. 3b. It will be appreciated, however, that the present method and apparatus can also produce autostereographs having barrier strips that have pitches finer than those of the interleaved images, e.g., to compensate for film contraction during processing.

A preferred embodiment of the present invention is illustrated in FIG. 4 and uses a high-resolution output imaging device that may produce color separation transparencies comprising dot screens for large-scale, high-quality offset printing. In this way, barrier-strip autostereographs can be economically and rapidly mass produced.

Referring to FIG. 4, there is shown a block diagram of an apparatus 100 in accordance with the present invention. A suitable computer 102 accepts digital inputs from any or all of a keyboard, trackball or other manual input device 104, hard or floppy disks, tape or other memory 106, a video frame digitizer or other suitable device 108 for converting television or other video signals into digital information, and a suitable image scanner 110 for converting hardcopy, such as positive or negative film transparencies or prints or other images, into digital information for manipulation by the computer 102. It will be understood that any suitable means for inputting data into the computer 102 may be employed in the apparatus 100. For example, a suitable video digitizer is the model JORGA 32, manufactured by Truvision, Inc., Indiana, and a suitable image scanner is the model 6461E Analyzer Unit, manufactured by Crosfield Electronics, Inc., Glen Rock, N.J.

As already described, the computer 102, which may be a model VAX 780 made by Digital Equipment Corporation or any other suitable computer, manipulates the input data to produce an output corresponding to a predetermined number of suitably interleaved planar images and a barrier strip. The output of the computer 102 is then directed to a suitable high-resolution image printer 112 such as a model 6461E Expose Unit laser scanner also manufactured by Crosfield Electronics, Inc. The computer 102 may also output information to a suitable CRT monitor 114 that enables the interactive manipulation of data input to the computer 102.

The Crosfield scanner is particularly suited for a high-resolution output imaging device 112 in a preferred embodiment of the present invention because, while it is much like a conventional, high-quality, full-color laser printer, it generates pixels having no visible steps with high resolution and position precision. A laser in the scanner selectively exposes monochromatic lithographic film with a fixed resolution of 1,000 lines per inch. Nevertheless, the images in the output of the scanner, comprising four monochromatic positive film transparencies for each of cyan, magenta, yellow and black, can consist of square, round or elliptic dots of selectable resolution. For example, each pixel in an output selected to have round dots with 250 dots per inch resolution is generated by four passes of the laser. To help obviate any annoying moire interferences which might arise during the production of autostereographs by the present method, it has been found that use of the Crosfield scanner in its M1R8 and half-line mode, described in more detail below, is desirable. In the M1R8 mode, the scanner's resolution is approximately 403×300 dots per inch, horizontal by vertical, and in the half-line mode, each "dot" has the form of a line segment whose width is determined by the grey value of the "dot".

As an additional measure to avoid moire, the image and barrier strip, which have been described as vertically oriented strips and slits, are printed vertically by the scanner 112. In this way, the vertical laser scan lines of the scanner 112 are more accurately aligned with the long edges of the interleaved image strips and transparent portions of the barrier strip. Furthermore, those edges are purposefully aligned with the long direction of the yellow dot or line segment output of the scanner, and the barrier strip, although black, is printed by the scanner with its yellow output channel. In this way, any observed moire occurs in the yellow portion of the image that is less perceptible to a human observer;- therefore, the visual quality of the autostereograph is improved. The yellow dots may be said to define a preferred direction for autostereographic printing.

It will be appreciated that the above-described selective alignment of the interleaved images and barrier strip with the yellow dots of the output printer 112 has been described in terms of a Crosfield scanner for illustration. Such equipment is used by several commercial printers, such as I.P.P. Lithocolor, Inc., Chicago, Ill. Other types of output printers may be employed in an apparatus in accordance with the present invention. For example other printers may be internally arranged so that colors other than yellow define preferred directions that can be used in the manner described above to avoid moire. The selective alignment and the control of the dot directions enhances the visual quality of the autostereographs produced by the present method, and such other printers may also have preferred directions so as to benefit from suitable alignment of the images and barrier strip.

Autostereographs may be produced in accordance with the present invention using various high-resolution output imaging devices besides the full-color Crosfield scanner. Indeed, acceptable results are obtained using desk-top publishing equipment such as that compatible with the POSTSCRIPT computer language format. POSTSCRIPT is a registered trademark of Adobe Systems, Inc., Palo Alto, Calif., and one item of such compatible publishing equipment is the Linotronic L300 typesetter. The L300 typesetter is a monochrome laser printer which has a maximum resolution of 2540 dots per inch; autostereographs have been produced operating the typesetter at 1270 dots per inch and printing output on transparency material.

Images of real and simulated objects that are resident as data in computer 102 can be interleaved and combined with a POSTSCRIPT header that specifies how the data is to be processed, e.g., the size of the image, the number of pixels, etc. In order to produce output pixels having a range of grey values, a POSTSCRIPT program converts each image pixel to a 4×4 array of dots with the number of dots printed yielding the desired variation.

The registration accuracy of small-scale, lower resolution printing equipment such as the Linotronic L300 can permit the interleaved images to be printed on one side of a transparency material and the barrier strip, which is produced in the same way as the interleaved images, on the other side. Increased moire is typically shown by the monochromatic autostereographs produced on such equipment, however, because of the spatial sampling effects arising from the discontinuous (dot-matrix) formation of the output pixels.

Figure 5:
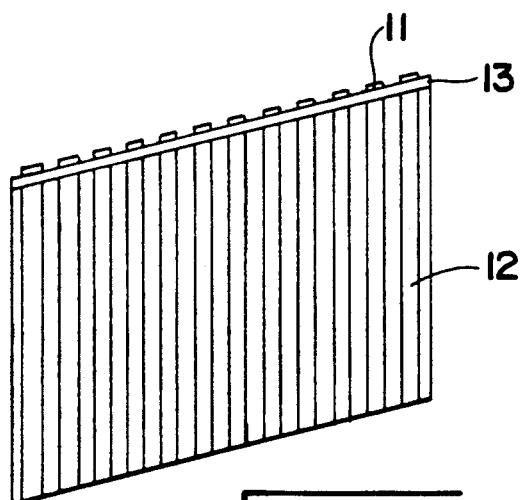
FIG. 5 shows an autostereograph in accordance with the present invention.

Returning to FIG. 4, the four color separation transparencies of the interleaved images and the barrier strip transparency or other output of the output device 112 may then be used in conventional four-color offset printing equipment 116 or a proofing process 118 such as the CROMOLIN process from E.I. duPont. The output 120 of equipment 116 and the output 122 of process 118 are both autostereographs, however, the equipment 116 enables inexpensive mass production of full color 3D images because the manual operation of registering the barrier strip and the interleaved images can be eliminated. As illustrated in FIG. 5, conventional offset printing equipment can automatically print the interleaved images 11 on one side of a thin, e.g., 0.02 inch thick, transparent film 13 such as polyvinyl or mylar (in essence any material than can be run through the offset printer) and print the barrier strip 12 on the other side of the same film with a very high registration accuracy in a manner that is well known. Registration of the barrier strip 12 and images 11 involves the careful alignment of the long or vertical edges of the images with the long or vertical edges of the transparent portions of the barrier strip 12. Conventional proofing processes, such as the CROMOLIN process, produce interleaved planar images on a full-color transparency on diffusion material that would be manually laminated to a spacer and the barrier strip transparency from the printer 112, for example by use of a light box and a frame. Lighting panels for backlighting autostereographs are available from Ferro Marketing, Milwaukee, Wis.

The Crosfield scanner circumvents several problems that were found with most common computer output devices; notably, the latter do not have the necessary resolution and precision needed to produce high-quality autostereographs. The computer-combining method typically can project a few hundred or a few thousand image pixels per inch, needing output position accuracies between 0.0001 to 0.0001 of an inch that are currently at or beyond the limit of present inexpensive desk-top publishing equipment. The spatial quantization of the output image imposed by the limited pixels per inch provided by inexpensive computer output devices, i.e., fewer pixels printed than available from the computer, causes even more moire patterns (sampling errors) when the barrier strip and the film are aligned.

To produce an output image using a Crosfield scanner, a predetermined number, n, of different views of a subject are rendered and combined with the computer 102, and the image data files and corresponding barrier strip data file are written to a 9-track magnetic tape. The data on the tape is input to the Crosfield scanner. The data format used on the tape should be compatible, of course, with the Crosfield archiving procedure. Detailed information on the Crosfield Magnetic Tape Format (A109) is available from Crosfield Electronics, Inc. In general, an image tape is recorded at 6250 bits per inch, Group Code Recording method, and is organized in four blocks of different length. The image block records such things as the tape number; the master directory keeps a record of all archives on the tape; the archive directory keeps a record of one image; the image data block contains the image pixel data.

It should be understood that it is possible to manipulate directly the scanner's line-screen dot generator, however, a large quantity of data is needed; therefore, it is somewhat more efficient that tapes are written in the scanner's standard format using standard procedures. The accuracy is good enough in this mode, but the spatial frequency of the dots generated by the scanner still has the potential to create moires from interference of the resulting barrier strip with the interleaved planar images; that is, the number of dots per inch in the output of the scanner is not necessarily coincident with the number of pixels per inch in the image and barrier strip data files. However, in producing barrier strip autostereographs, coincidence between two images (a barrier strip and an interleaved image) is just what is desired which is effectively a spatial sampling of the dot pattern in addition to the samplings done by the mere production of the interleaved image and the barrier strip. This has the potential of causing very disturbing moving dot and line patterns in the final 3D image.

Figure 6:
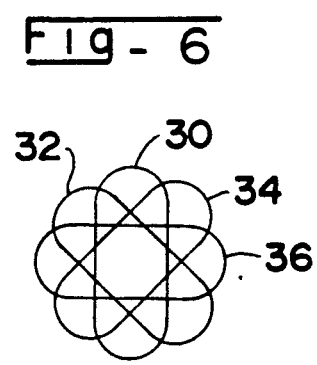
FIG. 6 shows a dot output by a preferred output device.

Also, as described above, dots are laid down by the scanner at different angles and varying sizes for different colors, the intersections of which form a rosette pattern. It should be understood that the angles and spacing of the dots have been carefully chosen by the scanner manufacturers to minimize moires with one another. As illustrated in FIG. 6, a typical four color scanner such as the Crosfield device in its elliptic dot mode forms images comprising overlapping dots corresponding to yellow 30, magenta 32, cyan 34 and black 36. Although illustrated for clarity as being disposed at mutual angles of 45°, the angles between the magenta 32 and cyan 34 dots and the yellow dot 30 are actually 15°, and the black dot 36 is at an angle of 30° with respect to the magenta or cyan dots. In the half-line mode, the line segments are drawn at the same relative angles as the elliptic dots.

In accordance with the present invention, this moire problem is ameliorated (1) by using the half-line mode (instead of the dot generator) of the scanner and (2) by aligning the columns of images and the barrier strip parallel with the lines produced in a preferred direction, e.g., the yellow channel of a Crosfield scanner, of the high-resolution output imaging device 112. Half-line mode draws single lines of varying width at the same angle the dot generator puts dots; hence, sampling or quantizing occurs in only one dimension instead of two. Nevertheless, test autostereographs produced with the CROMOLIN proofing process and with an offset printer showed very little moire using transparencies produced by the Crosfield scanner in its elliptic dot mode.

As described above, the apparatus 100 illustrated in FIG. 4 produces barrier-strip autostereographs, each comprising a selectable number, n, of interleaved planar images and a barrier strip. Besides generating images in a computer graphics environment and their proper projections, the computer 102, can advantageously format the input image data. For example, when 13 planar images are interleaved to form an 11×14-inch (horizontal×vertical) autostereograph using the Crosfield output scanner in its M1R8 mode, each planar image should have a resolution of about 338 pixels×4200 pixels. In the M1R8 mode, the scanner produces transparencies having about 400 dots per inch resolution in a horizontal direction and about 300 dots per inch resolution in a vertical direction. Since electronic image frame buffers having resolutions of 1024×1280 pixels are readily commercially available, images in such a buffer are optimally formatted as 1050×338 pixels. The computer 102 would then quadruple the 1050-pixel horizontal and interchange the horizontal and vertical directions since it will be recalled that the vertical direction in the autostereograph is selected to be parallel to the scan direction, which is usually horizontal, of the output device 112. In this way, the image's pixels are replicated vertically with the resolution in that direction as large as possible. The resolutions just discussed are great enough so that pixel-pixel interpolation calculations, for example using a conventional interpolation on each image with computer 102, are not necessary.

The planar images can be produced by any suitable apparatus such as a video, movie or still camera moved in an "off-axis perspective project" motion. Such motion is equivalent to a "truck" in the motion picture industry and involves, in essence, aiming the camera at the center of the image subject to generate the central interleaved image, (e.g., the image producing strips 11-3 in FIG. 1), then moving the camera horizontally, i.e., left and right, without re-centering the image subject, to generate the other planar images to be interleaved. Once the planar images are captured and input to the computer 102 or other suitable image processing device, the images are easily registered by shifting their pixels such that a particular subject point common to each image is in the same place, e.g., the center, in the frame. This form of camera motion is needed to obtain proper optical perspective in the autostereograph. Although it may be easier to move the camera so as to keep it aimed at the center of the image subject, thus avoiding a need to do image registration in computer 102, such motion is a rotation of the subject that only approximates the planar images needed for true perspective in the autostereograph. The approximation can be quite acceptable, however it will be understood that the few-pixels difference between the perspective images and rotation images is often sufficient to give an observer a feeling that the autostereographic image is subtly "wrong".

When the input planar images are produced in a computer graphics environment, or otherwise mathematically generated, a mathematical shear operation, as described above, can be used. A shear of the images along the x-axis (horizontal in the autostereograph), including both the image objects and light sources, produces an autostereograph without unrealistic behavior of shadows or highlights.

Good 3D results have been obtained in a 13-strip autostereograph comprising a ⅛-inch thick plexiglass spacer and a barrier strip having a pitch of 403/13 lines per inch for an image subject positioned at a viewing distance of 500 arbitrary units from the camera or point of view and a horizontal camera motion of ±66 units from the center interleaved image position or viewpoint. Thus, 13 planar images of the subject were generated at horizontal positions of −66, −55, −44, −33, −22, −11, 0, 11, 22, 33, 44, 55 and 66 units. These values are dependent on the thickness of the spacer between the barrier and the film, the pitch of the barrier strip and the number of images interleaved. For example, the values are doubled for an autostereograph having a thickness of ¼-inch and otherwise as just described. When mass producing autostereographs, it has been found desirable to use 9 interleaved images, a spacer of 0.02 inch thickness and a barrier strip having a 403/9 pitch. The viewpoints needed may of course be determined from the above-described off-axis projection calculations.

In general it has been found that the total horizontal motion of the camera or viewpoint should be approximately ⅛ of the viewing distance to the subject. It will be understood that the distance between frames or images will largely determine the amount of depth that will be perceived when viewing the autostereograph, and the spacing of separate viewpoints is to be adjusted for the optimum perception of depth. This could possibly be defined by the traditional variables used by the Polaroid Inter Occular Calculator, for example, for determining the parallax for shooting standard stereoscopic pictures with the additional consideration that this optimum determination is usually assigned to the image viewed by each eye from the average, typical, or desired distance from the final display. This would normally define the distance between average exposures, for example, images 11-2 and 11-4 in FIG. 1. See S. Kitrosser, "Polaroid Interocular Calculator", Photographic Science and Technique Section B of the Photographic Society of America Journal, Volume 19B, Number 2, Pages 74-76, May 1953.

The total parallax should not exceed comfortable hyperstereoscopic viewing for the normal interpupilary viewing distance, and the images should be produced from viewpoints equally spaced within that range. Even though this optimization is sought, there is enough flexibility in the systems described herein to compensate for non-optimal spacing while still rendering-acceptable images. It will be understood that interleaving a greater number of images produces a greater depth of field for the subject of the autostereograph.

Furthermore, it has been found that about $\frac{1}{8}$ of the total horizontal motion, i.e., 0.132 of the viewing distance, is a shear value that gives good results for the outermost images. Thus, for 13 planar images and a $\frac{1}{8}$-inch spacer, shear values of $-0.132$, $-0.11$, $-0.088$, $-0.066$, $-0.044$, $-0.022$, 0.0, 0.022, 0.044, 0.066, 0.088, 0.11 and 0.132 are suitable. Using the $\frac{1}{8}$-inch spacer, the full-color interleaved image transparency produced, for example, by the CROMOLIN process was manually attached to the spacer with a suitable adhesive. The barrier strip transparency was similarly attached in registration to the opposite side of the spacer.

In addition, it has been found that the viewing distance may normally be roughly 2-3 times the width of the autostereograph, although this is not critical.

In producing the images for autostereographs, it will be appreciated that the images may advantageously include approximately 2-4 pixels of motion in the far foreground of adjacent planar images, depending on the number of interleaved images and their pixel resolution, so that the discontinuities between the images in adjacent image strips will be less perceptible as jumpiness in the autostereograph. If the image subject has high-frequency information in the far foreground, i.e., abrupt surface depth changes, less pixel motion is desirable. Subjects having low-frequency information in the far foreground, i.e., smooth surfaces, give better results with more pixel motion.

It will also be appreciated that the usual image processing aspect ratio considerations should be applied in light of the horizontal and vertical pixel densities of the output imaging device, the interleaving of images, the pixel shape of the CRT used, the pixel shape of any graphics software used, etc.

Although the foregoing description of mass production of autostereographs using conventional offset printing equipment is cast in terms of barrier-strip type images, it will be appreciated that the advantages of the present method and apparatus can also be used in producing lenticular-sheet autostereographs. Lenticular-sheet autostereographs replace the barrier strip with a linear array of suitably sized cylindrical lenses. Rather than feeding flat material to the offset equipment and printing the interleaved images on one side and the barrier strip on the other, the material could easily be pre-lenticulated on one side and the interleaved images would be printed on the other side with the good registration available from offset printing equipment. The surface contour for such a lenticulated spacer is well-known and is described, for example, in U.S. Pat. No. 4,600,297.

It will be understood that the present invention includes all those output imaging techniques that produce transparency or other output suitable for making high-quality autostereographs. For example, new devices are being developed that draw images "continuously", i.e., without forming the images in a dot-matrix format such as the Linotrinic typesetter or in a rosette-like format such as the Crosfield scanner. The outputs of such devices, corresponding to the four color separation transparencies produced by the Crosfield imaging device, would be presented to an offset printer and scanned into that industry just as positive prints and images are today.

In addition, other techniques for forming full-color images as well as printing techniques such as web printing, gravure printing, intaglio and continuous-tone printing may also be used with the present invention. U.S. Pat. No. 3,306,974, herein incorporated by reference, describes a method for making color images with a monochromatic film illuminated by color-separated light sources. To reduce moire effects it should be necessary only to align the barrier strip or lenticulation in the direction perpendicular to the color lines described in the incorporated patent produced from the interleaved image strips. Such colored lines formed on a monochromatic transparency film, which would give the appearance of a conventional shadow mask, can also be produced by a Crosfield scanner or other high-resolution output imaging device.

The present description and drawings are intended only to be illustrative, and one of ordinary skill in the art will recognize that various modifications could be made without departing from the spirit or scope of the present invention that is to be limited only by the following claims.

What is claimed is:

1. A method of making autostereographic images of an object, comprising the steps of:
   inputting to a computer a predetermined number of planar images of the object, each of the planar images being a view of the object from one of the predetermined number of different viewpoints;
   interleaving the predetermined number of planar images in the computer;
   printing the interleaved images with a high-resolution output imaging device on a spacer, a selected edge of each interleaved image being aligned with a predetermined printing direction;
   generating a barrier strip; and
   positioning the barrier strip in a spaced relationship with the spacer and in a registration relationship with the spacer.

2. The method of claim 1, wherein the spacer is transparent and the step of generating a barrier strip comprises generating the barrier strip in the computer and the step of positioning the barrier strip comprises printing the barrier strip with the high-resolution output imaging device, the barrier strip being printed on the opposite side of the spacer and in a predetermined relationship to the interleaved images and being aligned with the predetermined direction.

3. The method of claim 1, wherein the high-resolution output imaging device has a preferred printing direction, and wherein the predetermined printing direction is the preferred printing direction.

4. The method of claim 3, wherein the spacer is transparent and the step of generating a barrier strip comprises generating the barrier strip in the computer and the step of positioning the barrier strip comprises printing the barrier strip with the high-resolution output imaging device, the barrier strip being printed on the opposite side of the spacer and in a predetermined relationship to the interleaved images and being aligned with the preferred printing direction.

5. An apparatus for making autostereographic images of an object, comprising:
 - means for generating a predetermined number of planar images of the object, each planar image being a view of the object from one of a predetermined number of different viewpoints;
 - a computer, the computer interleaving the predetermined number of planar images; and
 - a high-resolution output imaging device, the output imaging device being in communication with the computer and having a preferred printing direction, for printing the interleaved images on a transparent spacer with selected edges of the images being aligned with the preferred printing direction.

6. The apparatus of claim 5, wherein the high-resolution output imaging device prints a barrier strip in a registered relationship to the interleaved images, the barrier strip being printed on the opposite side of the spacer and aligned with the preferred printing direction.

7. The apparatus of claim 5, wherein the generating means inputs to the computer images of at least one of real and imaginary objects.

8. The apparatus of claim 5, wherein the generating means stores a planar image of the object and the computer generates a predetermined number of off-axis perspective projection images of the object.

9. An autostereograph comprising:
 - a transparent spacer;
 - a predetermined number of computer-generated planar images, the planar images being views of an object from a predetermined number of different viewpoints and being interleaved in strips and printed in alignment with a preferred printing direction on a side of the spacer; and
 - means for viewing predetermined ones of the strips according to an observation position, the viewing means being disposed in a registered relationship to the strips on the opposite side of the spacer.

10. The autostereograph of claim 9, wherein the viewing means is a barrier strip, the barrier strip having alternating transparent and blocking linear portions and being printed on the side of the spacer opposite to the side on which the strips are printed with the linear portions being substantially aligned with the strips.

11. The autostereograph of claim 10, wherein the spacer is substantially 0.02 inches thick.

12. The autostereograph of claim 9, wherein the planar images are printed in full color.

13. The autostereograph of claim 9, wherein the viewing means is a lenticulation of the side of the spacer opposite to the side on which the strips are printed, the lenticulation comprising a plurality of cylindrical lenses substantially aligned with the strips.

14. A method of making autostereographs using a digital computer and a high-resolution printer having a preferred printing direction comprising the steps of:
 - storing an image of an object in the computer;
 - generating a predetermined number of off-axis perspective projection images of the object from the stored image;
 - interleaving the projection images;
 - orienting the interleaved images in accordance with the preferred printing direction;
 - printing the interleaved images on a transparent spacer with the high-resolution printer;
 - generating a barrier strip; and
 - positioning the barrier strip with respect to the spacer in a registered relationship with the printed, interleaved images.

15. The method of claim 14, wherein the computer generates the barrier strip and the positioning step includes the step of printing the barrier strip on the transparent spacer with the high-resolution printer.

* * * * *